No. 832,620. PATENTED OCT. 9, 1906.
E. P. NOYES.
THERMOSTATIC LEVEL CONTROLLER.
APPLICATION FILED OCT. 12, 1905.
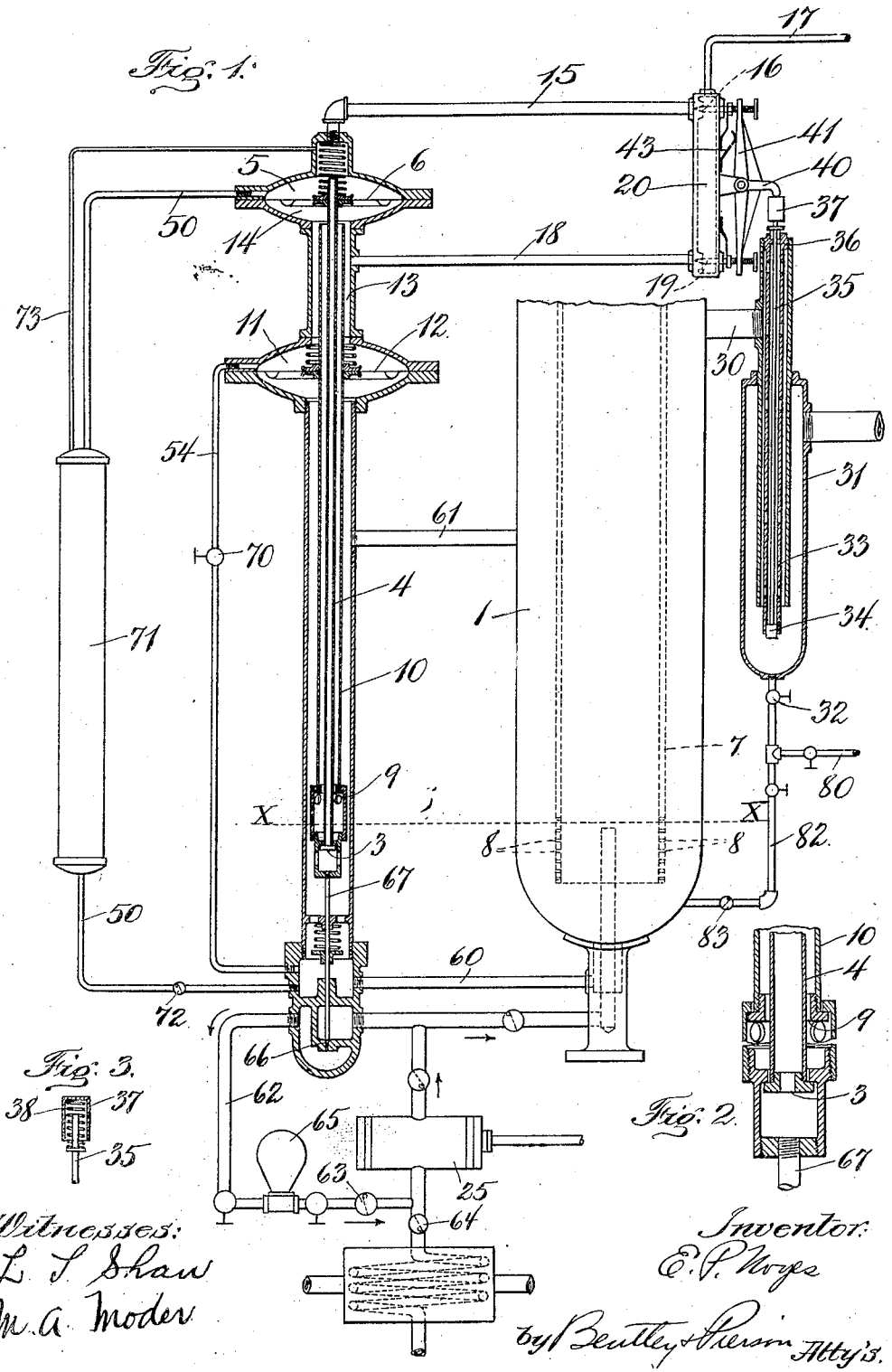

UNITED STATES PATENT OFFICE.

EDWARD P. NOYES, OF WINCHESTER, MASSACHUSETTS.

THERMOSTATIC LEVEL-CONTROLLER.

No. 832,620.　　　　　Specification of Letters Patent.　　　　Patented Oct. 9, 1906.

Application filed October 12, 1905. Serial No. 282,397.

*To all whom it may concern:*

Be it known that I, EDWARD P. NOYES, a citizen of the United States, residing at Winchester, in the county of Middlesex and State of Massachusetts, have invented certain new and useful Improvements in Thermostatic Level-Controllers, of which the following specification and accompanying drawings illustrate the invention in a form which I now regard as the best out of the various forms in which it may be embodied.

This invention aims to automatically control the temperature of a fluid by varying a water-level—as, for example, where the level of water in an internal-combustion steam and gas generator is varied to regulate the by-passing of unquenched products of combustion around the body of water and to regulate the area for surface-superheating or where a steam-superheater is more or less flooded with water to control the temperature of the steam.

The invention involves the use of an automatic level-controller, preferably of the type employing a diaphragm or equivalent having chambers on opposite sides, in one of which the fluid-pressure is varied by the action of the shifting water-level to create a differential pressure on the diaphragm, whereby motion is transmitted to a feed-valve or other device for controlling the rate of supply of feed-water to the vessel controlled. To such a controller I would apply a thermostat subject to the temperature of the output of the generator or superheater and controlling the differential pressure on the diaphragm through a suitable device, such as a valve governing the leakage from the variable-pressure diaphragm-chamber.

The invention also involves certain improvements in level-controlled apparatus hereinafter described.

Of the accompanying drawings, Figure 1 represents a sectional view of a thermostatic level-controller embodying my invention and applied to an internal-combustion steam and gas generator. Fig. 2 represents an enlarged section of the inlet ends of the dip-tubes. Fig. 3 represents a section of the head of the thermostatic rod.

The same reference characters represent the same parts in all the views.

1 is a generator of the type shown in Reeve Patents Nos. 588,178 and 588,293 and including a constant-pressure burner (not shown in these drawings) and a combustion-tube 7, leading therefrom and having its outlet in a body of water in the cooling-chamber formed by the lower part of the outer generator-casing, the gases issuing through a series of perforations 8 in the lower part of the combustion-chamber. The steam thus created is superheated in passing upwardly around the outside of the hot combustion-tube and also by the by-passing of unquenched gases through the upper rows of holes 8, which at times may not be covered by water.

For supplying feed-water there is a pump 25, delivering to the generator 1 and having a by-pass 62, controlled by a needle-valve 66 and leading back to the pump between its cylinder and the inlet check-valve 64, said by-pass also having a check-valve 63 and cushion-chamber 65, an arrangement which has been found to give good results and to be superior to a simple by-pass discharging to the suction-conduit of the pump for this kind of a controller.

The stem 67 of valve 66 is attached to a dip-tube 10, supported by a diaphragm 12, and is further controlled by a dip-tube 4 within tube 10 and supported by a second diaphragm 6 above diaphragm 12, the tube 4 having a head so that the upward movement of either diaphragm opens by-pass valve 66 and diminishes the supply of feed-water to the generator. Tube 4 has its inlet at 3 and tube 10 its inlet just above at 9. Pipes 60 and 61 connect the casing of the controller with the generator 1 below and above the water-line, so that the level stands the same in both.

Below the diaphragm 12 is the constant pressure of the generator and above it is a chamber 11, whose pressure-inlet is the tube 10 subject to the water-level. Below the diaphragm 6 is a pressure-chamber 14, connecting with chamber 11 by the open channel 13, and above diaphragm 6 is the chamber 5, whose pressure-inlet is tube 4.

From the two upper diaphragm-chambers 5 and 11 lead leakage-pipes 15 and 18, connecting into a common header 20, and pipe 17, leading to some locality of lower pressure than the generator-pressure. These pipes are controlled by needle-valves 16 19, carried by opposite ends of a pivoted lever 41, having an arm 40. This is pressed by a spring 43 against a cap 37 on the upper end of an aluminium rod 35, there being an interposed spring 38, permitting rod elongation after the upper valve 16 is closed. The lower end of this rod is mounted in a plug 34 at the bottom of a perforated steel tube 33, whose upper end 36 is fixed. The lower end of the tube projects into a casing 31, included in the course of the outlet-pipe 30, which conducts the motive mixture of steam and products of combustion away from the generator. This casing also forms a separater, which automatically drains back to the water-pot through a pipe 82, containing check-valve 83 and cock 32 and having blow-off 80. This separator removes dust resulting from excess of by-passed hot gases and finely-divided water or fog caused by violent ebullition in a restricted cooling-chamber. The aluminium rod 35 and steel tube 33 constitute a thermostat in which the elongation of the rod by heating is greater than that of the tube, so that temperature in the conduit 30 above a predetermined point tends to close the needle-valve 16 and open 19, while a temperature below that point has the opposite effect. The exact location or construction of the thermostat is not material so long as it performs the functions described.

The chamber 11 above the lower diaphragm 12 drains back to the water-space of the generator through a pipe 54, having an inlet just above said diaphragm, but considerably below the upper end of tube 10 and containing a stop-valve 70, while the chamber 5 above upper diaphragm 6 drains back to the water-space by a pipe 50 50, in which is a reservoir 71, having a vent 73, back to chamber 5. A check-valve 72 in said conduit below the reservoir opens toward the generator.

The operation is as follows: Water rises in generator and controller until it reaches about the level X X, covering the inlet 3 of dip-tube 4. Leakage from the chamber 5 above diaphragm 6 by way of pipes 15 17 and the open valve 16 then reduces the pressure in said chamber and the diaphragm 6 rises, opening the by-pass valve 66 and diminishing or stopping the supply of feed-water. At this level, however, the uppermost row of perforations 8 remains uncovered and the superheating of the mixture of gases and steam by surface conduction and by-passing of unquenched gases increases until the thermostat 33 35 has closed leakage-valve 16. This bottles the upper diaphragm-chamber 5 and puts the upper controller out of commission for the time being, for pressures above and below diaphragm 6 are quickly balanced through a fall of water-level by evaporation, causing the diaphragm to close by-pass valve 66, after which the water-level can rise without hindrance past the inlet of tube 4. It does so until sufficient outer surface of the combustion-tube 7 has been covered and perforations 8 closed to reduce the superheat to a point where the thermostat opens valve 16 and again places the upper diaphragm in operative condition, so that it may check further rise of water-level.

Since the lowering of temperature to the point of operating the thermostat may not take place quickly enough to prevent an undue flooding of the generator, especially in view of the surface superheat by combustion-tube 7 after all perforations 8 are covered, I utilize the operative effect of the second controlling-diaphragm 12 to finally limit the rise of water-level. When the water reaches the inlet 9 of tube 10, pressure in chamber 11 above diaphragm 12 is reduced by leakage through pipes 18 17 and the then-opened needle-valve 19, whereupon by-pass valve 66 is opened. After the thermostat has cooled and placed the upper diaphragm 6 in commission it would be undesirable to have a continued leakage from chamber 11, and I therefore place the valve 19 under control of the thermostat, although this is not essential in the simplest form of the invention.

It will be seen that the thermostat varies the standard level established by the controller.

When during a period of high water-level the thermostat opens valve 16, the blow past said valve causes water to rise in tube 4 and flood the chamber 5 for a time until the level has fallen below inlet 3. To immediately return this water to the generator would retard the dropping of the level, and I therefore store the water thus blown over in chamber 71, into which the water from the generator is prevented from backing up by check-valve 72. As soon as inlet 3 has been uncovered and full pressure restored to the chamber 5 this stored water returns by gravity to the common level and contributes stability at a time of falling level.

Such water as may be blown up through dip-tube 10 if allowed to accumulate in chamber 11 creates a head counter to the upward differential pressure in diaphragm 12 and diminishes the power available for operating the valve 66. As a small power means economy in operation, I may partially close the valve 70 in return-pipe 54 and regulate this counter-head to a desired amount.

The diaphragms 6 and 12 I prefer to make of rubber or equivalent material instead of metal, since they are found to remain cool, because the steam in the fluid which reaches them condenses out and leaves comparatively dry gases of low specific heat in contact with them. The rubber diaphragms are more flexible than metal and possess other advantages.

What I claim as new, and desire to secure by Letters Patent, is—

1. A vessel adapted to contain a pool of water and discharging a fluid whose temperature is varied by varying the water-level, a level-controlled automatic device for varying the water-level, and means controlled by the temperature of the output from said vessel for varying the standard level established by said device.

2. An internal-combustion steam and gas generator having a combustion-tube outletting at different heights, means for establishing in said generator a pool of water more or less immersing the outlet, whereby more or less of the products of combustion may be by-passed unquenched around the water pool, and means controlled by the temperature of the generator output for varying the level of the water pool.

3. An internal-combustion steam and gas generator having a combustion-tube with a plurality of outlets at different heights, means for supplying a pool of water in the lower part of said generator immersing the discharge end of said tube, a superheating-passage extending upwardly from said pool and embracing the combustion-tube, an eduction-conduit leading from said passage, an automatic level-controller establishing the level of the pool at or about said outlets, and a thermostat in said conduit for varying the standard level, established by said level-controller.

4. In combination, a pressure vessel having a variable liquid-level and a vapor-discharge whose temperature depends upon the liquid-level, a member operated by differential pressure caused by variation in said level for performing a useful function with respect to the vessel, and means controlled by the temperature of the discharge from said vessel for controlling said differential pressure.

5. In combination, a vessel discharging a heated vapor, means for supplying water to said vessel, a water-level controller operated by differential pressure, and a thermostat subject to the temperature of the vapor-discharge from said vessel for varying the differential pressure.

6. In combination, a differential member having pressure-chambers on opposite sides thereof, a leakage-outlet from one of said chambers, a valve controlling said outlet, a thermostat controlling the valve, and a chamber adapted to contain a body of water whose level controls the pressure in the leakage-chamber and furnishing steam whose temperature controls the thermostat.

7. In combination, a pressure vessel having a steam-discharge, means to supply water thereto, and a controller for so varying said supply as to regulate the temperature of the steam, the same comprising a differential member having chambers on opposite sides thereof, means for controlling the pressure in one of said chambers by the level of the water, and a leakage-outlet having a valve controlled by the temperature of the steam.

8. In combination, a pressure vessel furnishing superheated steam, means for supplying a body of water therein whose level controls the temperature of the steam, an automatic level-controller controlled by the temperature of the steam, and a second automatic level-controller operating at a higher standard level than the first said controller.

9. In combination, a superheating steam-pressure vessel, an automatic device controlling the water-level therein, and a second automatic level-controller operating by differential pressure at a different standard level from said device and having a leakage-outlet controlling the differential and controlled by the temperature of the steam from said vessel.

10. The combination of a feed-valve, two automatic level-controllers operating at different standard water-levels and both controlling said valve, and temperature-actuated means for controlling one of said level-controllers.

11. The combination of upper and lower diaphragms each having pressure-chambers on its opposite sides, two dip-tubes attached to the respective diaphragms and located one within the other for controlling the pressure on one side of each diaphragm by means of a varying liquid-level, and mechanism operated by said diaphragms.

12. In combination, a steam-pressure vessel, two automatic devices controlling the water-level therein and operating at different standard water-levels, and means for disabling one of said devices upon the attainment of a predetermined steam temperature.

13. In combination, a steam-pressure vessel, two automatic devices controlling the water-level therein and one operating at a lower standard water-level than the other, and a thermostat controlled by the steam temperature and adapted to disable the latter device.

14. In combination, a steam-pressure vessel, two automatic level-controllers therefor operating at different standard water-levels respectively, and means controlled by the steam temperature for alternatively rendering said devices temporarily inoperative.

15. The combination of two level-controlled members operated by differential pressure and having leakage-valves for varying the differential, a lever opening and closing the respective valves alternatively, and a thermostat for operating said lever.

16. A liquid-level-controlled mechanism comprising a differential member adapted to be elevated above the liquid-level, a pressure-chamber on one side thereof, a conduit opening into said chamber and having an inlet subject to the liquid-level, a return-conduit extending from said chamber to a point below the liquid-level and having a reservoir-space, and a check-valve in said return-conduit located below said reservoir-space and opening away therefrom.

17. In combination, a pressure vessel adapted to contain a liquid, a differential member above the liquid-line, a pressure-chamber on the upper side of said member, a conduit having an inlet subject to the liquid-level and an outlet to said chamber above the level of said member, a return-conduit having an outlet to said vessel below the liquid-line and an inlet from said chamber below the outlet of the first said conduit, and an adjustable throttle-valve in said return-conduit.

18. In combination, a pressure vessel, a pump for supplying feed-water thereto and having a suction-conduit, a check-valve in said conduit, a by-pass leading from the delivery side of the pump and discharging to the suction side thereof at a point between the pump and said check-valve, a valve in said by-pass, and a level-controller operated by differential pressure and controlled by the water-level in said vessel for controlling said valve.

19. In combination, a steam and gas constant-pressure generator, controller-chambers located above the liquid-level in said generator and receiving the pressure of its contents, means controlled by the water-level for varying the relative pressures, and a diaphragm separating said chambers and composed of a flexible non-metallic material such as rubber.

In testimony whereof I have hereunto set my hand, in the presence of two subscribing witnesses, the 1st day of September, 1905.

EDWARD P. NOYES.

Witnesses:
  A. M. HARRISON.
  L. E. KENNEDY.